(12) United States Patent
Morishita

(10) Patent No.: US 10,773,295 B2
(45) Date of Patent: Sep. 15, 2020

(54) ALIGNMENT APPARATUS FOR HAIRPIN-SHAPED HEAT EXCHANGER TUBES

(71) Applicant: HIDAKA SEIKI KABUSHIKI KAISHA, Tokyo (JP)

(72) Inventor: Keiichi Morishita, Tokyo (JP)

(73) Assignee: HIDAKA SEIKI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/323,700

(22) PCT Filed: Nov. 14, 2016

(86) PCT No.: PCT/JP2016/083709
§ 371 (c)(1),
(2) Date: Feb. 6, 2019

(87) PCT Pub. No.: WO2018/087925
PCT Pub. Date: May 17, 2018

(65) Prior Publication Data
US 2019/0168284 A1 Jun. 6, 2019

(51) Int. Cl.
*B23P 15/26* (2006.01)
*B21D 53/08* (2006.01)
(Continued)

(52) U.S. Cl.
CPC .............. *B21D 53/08* (2013.01); *B23P 15/26* (2013.01); *F28D 1/047* (2013.01); *F28F 1/32* (2013.01)

(58) Field of Classification Search
CPC .................................. F28F 1/32; B23P 15/26
See application file for complete search history.

(56) References Cited

U.S. PATENT DOCUMENTS

| 4,584,751 A | 4/1986 | Gray et al. |
| 5,426,847 A | 6/1995 | Honma et al. |

FOREIGN PATENT DOCUMENTS

| JP | 60-242923 A | 12/1985 |
| JP | 6-015392 A | 1/1994 |

(Continued)

OTHER PUBLICATIONS

JPH0615392 english translation (Year: 1994).*
(Continued)

*Primary Examiner* — Jason L Vaughan
*Assistant Examiner* — Amanda Kreiling
(74) *Attorney, Agent, or Firm* — Birch, Stewart, Kolasch & Birch, LLP

(57) ABSTRACT

An alignment apparatus is capable of suppressing widening of legs of hairpin-shaped heat-exchanger tubes and aligning the hairpin-shaped heat-exchanger tubes in the horizontal direction at a regular pitch. The alignment apparatus includes: a plurality of outer guide plates that have rollers, which contact upstream sides of legs of the hairpin-shaped heat-exchanger tubes that have been stopped by a stopper apparatus, and that contact outer side surfaces of the legs; a horizontal movement apparatus that moves the outer guide plates in a horizontal direction; an up-down movement apparatus that moves the outer guide plates in an up-down direction; and a control unit that drives the horizontal movement apparatus to move the outer guide plates a predetermined distance toward an insertion position, and then drives the up-down movement apparatus to raise the outer guide plates by a predetermined distance to change an orientation of the hairpin-shaped heat-exchanger tubes to the horizontal direction.

3 Claims, 16 Drawing Sheets

(51) Int. Cl.
*F28D 1/047* (2006.01)
*F28F 1/32* (2006.01)

(56) References Cited

FOREIGN PATENT DOCUMENTS

JP 9-29372 A 2/1997
JP 3315151 B2 8/2002

OTHER PUBLICATIONS

International Search Report (PCT/ISA/210) issued in PCT/JP2016/083709, dated Dec. 6, 2016.
Korean Office Action for Korean Application No. 10-2019-7007040, dated May 11, 2020, with English translation.

* cited by examiner

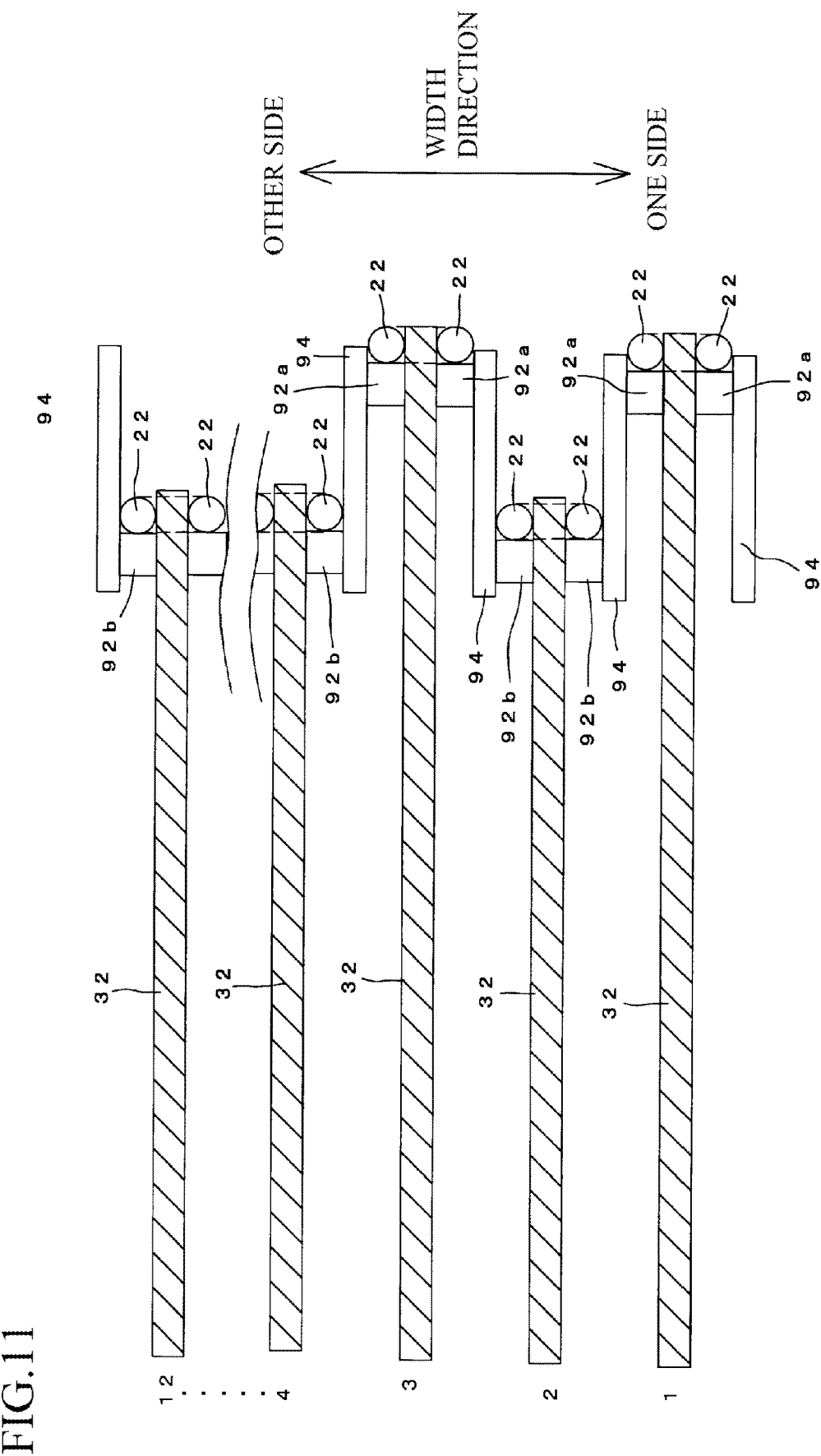

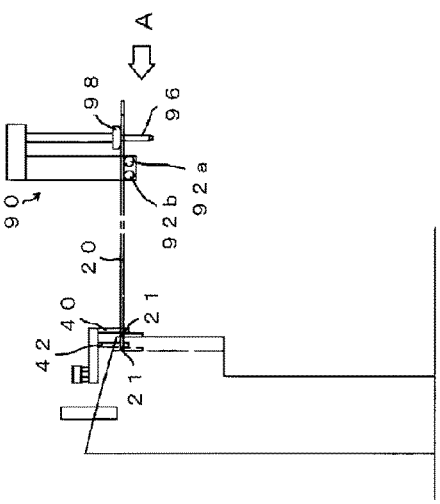
FIG.12D
FIG.12C
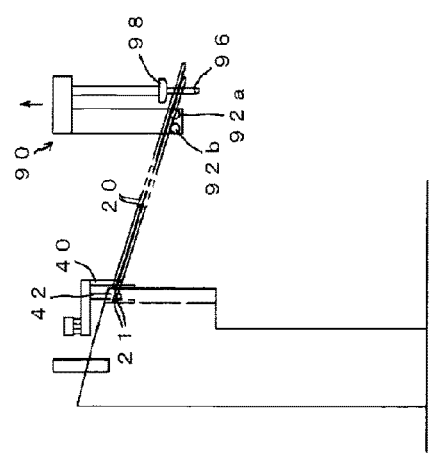
FIG.12B
FIG.12A
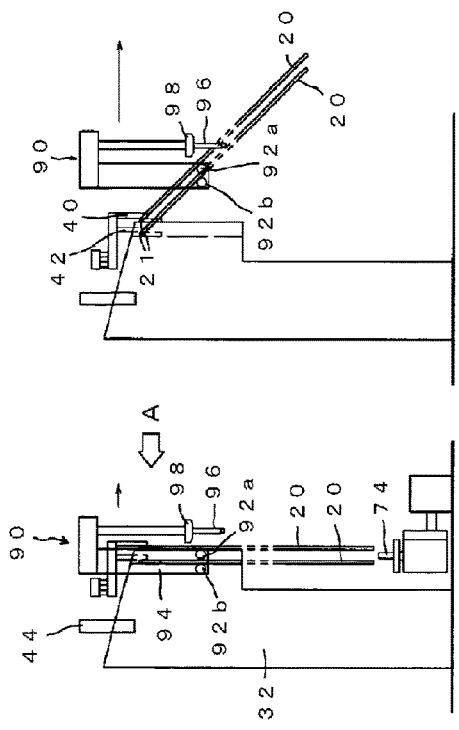

US 10,773,295 B2

ALIGNMENT APPARATUS FOR HAIRPIN-SHAPED HEAT EXCHANGER TUBES

TECHNICAL FIELD

The present invention relates to an apparatus that changes the orientation of and aligns hairpin-shaped heat-exchanger tubes, which are to be inserted into stacked fins, before feeding to an insertion apparatus.

BACKGROUND ART

As depicted in FIG. 15, a heat exchanger, such as an air conditioner, is constructed by inserting heat exchanger pipes, in which a heating medium flows, into through-holes 11 in a fin stack 10 that has been produced by stacking a plurality of fins 9 in which the through-holes 11 are formed. Hairpin-shaped heat exchanger tubes 20, which are formed by bending copper pipes into U shapes at a central part thereof, are used as the heat exchanger pipes.

As depicted in FIG. 16, an insertion apparatus 5 is used to insert the hairpin-shaped heat-exchanger tubes 20 into the fin stack 10 (see FIG. 5 of Patent Literature 1).

The insertion apparatus 5 illustrated here has the fin stack 10 stacked in the up-down direction and inserts the hairpin-shaped heat-exchanger tubes 20 into the fin stack 10 by lowering the hairpin-shaped heat-exchanger tubes 20 from above.

Hairpin-shaped heat-exchanger tubes 20 that have been discharged from a bender, which is a pipe bending apparatus, are fed to the rear surface side of the insertion apparatus 5 and hang downward with a bent portion 21 in the center of each hairpin-shaped heat-exchanger tube 20 suspended on a rod 6.

The hairpin-shaped heat-exchanger tubes 20 that have been hung on the rod 6 are conveyed to an alignment apparatus 7 of the insertion apparatus 5. The alignment apparatus 7 has an inclined plate 8 whose upper surface is downwardly inclined toward the insertion position. The bent portion 21 in the center of each hairpin-shaped heat-exchanger tube 20 is disposed on the upper surface of the inclined plate 8, and the hairpin-shaped heat-exchanger tubes 20 automatically move toward the insertion position by sliding under their own weight.

A plurality of such inclined plates 8 are provided in the depth direction with respect to the plane of FIG. 16, with hairpin-shaped heat-exchanger tubes 20 stocked on each of the plurality of inclined plates 8.

The hairpin-shaped heat-exchanger tube 20 positioned at the bottom of each inclined plate 8 has its bent portion 21 clamped by a clamping apparatus 4 and is inserted into the fin stack 10.

The hairpin-shaped heat exchanger tubes 20 are discharged from a bender, which is a pipe bending apparatus, and the hairpin-shaped heat exchanger tubes 20 are conveyed to an insertion apparatus for hairpin-shaped heat exchanger tubes with the bent portions 21, which are the bent parts in the centers of the hairpin-shaped heat exchanger tubes 20, hung on a rod.

CITATION LIST

Patent Literature

Patent Literature 1: Japanese Patent No. 3,315,151

SUMMARY OF INVENTION

Technical Problem

There are cases where the legs of the hairpin-shaped heat exchanger tubes widen or become twisted, so that it is common for the legs to not have the same width as the pitch of the through-holes. Also, even when the tubes are aligned so that the bent portions of the hairpin-shaped heat exchanger tubes are the same as the pitch of the through-holes, if the legs have widened, the legs will overlap adjacent legs.

In particular, for an insertion apparatus for hairpin-shaped heat exchanger tubes that has the hairpin-shaped heat exchanger tubes disposed on a horizontal plane and inserts the hairpin-shaped heat exchanger tubes into a fin stack by moving the hairpin-shaped heat exchanger tubes in the horizontal direction or by moving the fin stack in the horizontal direction, it is necessary to close the legs of the hairpin-shaped heat exchanger tubes so that the legs become parallel with each other and to also change the orientation of the hairpin-shaped heat exchanger tubes from the state where the bent portions are hung on the rod before the tubes are transported into the insertion apparatus for hairpin-shaped heat exchanger tubes.

The present invention was conceived to solve the problem described above and has an object of providing an alignment apparatus that closes the legs of hairpin-shaped heat-exchanger tubes and changes the orientation of the hairpin-shaped heat exchanger tubes between a bender and an insertion apparatus for hairpin-shaped heat exchanger tubes.

Solution to Problem

An alignment apparatus for hairpin-shaped heat-exchanger tubes according to the present invention is an alignment apparatus for aligning hairpin-shaped heat exchanger tubes to be inserted into through-holes in a fin stack for heat exchanging and includes: a regular pitch alignment unit that has arrangement plates, which each have an inclined portion whose upper surface is downwardly inclined toward an insertion position side, on whose inclined portions bent portions of the hairpin-shaped heat-exchanger tubes are suspended, and which are disposed so that the hairpin-shaped heat-exchanger tubes are oriented in an up-down direction, the arrangement plates being disposed at intervals that are double a pitch of the through-holes in the fin stack; a stopper apparatus including a plurality of stoppers that stop the hairpin-shaped heat-exchanger tubes by contacting downstream sides of the bent portions of the hairpin-shaped heat-exchanger tubes at different positions on an upstream side and a downstream side in an inclined direction for each arrangement plate so that the hairpin-shaped heat-exchanger tubes disposed on the arrangement plates of the regular pitch alignment unit do not become adjacent at a same position; a plurality of outer guide plates that each include a roller that contacts an upstream side of a leg of a hairpin-shaped heat-exchanger tube that has been stopped by the stopper apparatus and that each contact an outer side surface of a leg of the hairpin-shaped heat-exchanger tube; a horizontal movement apparatus that moves the outer guide plates in a horizontal direction; an up-down movement apparatus that moves the outer guide plates in an up-down direction; and a control unit that drives the horizontal movement apparatus to move the outer guide plates by a predetermined distance toward the insertion position and then drives the up-down movement apparatus to raise the outer guide plates by a predetermined distance to change an orientation of the hairpin-shaped heat-exchanger tubes to the horizontal direction.

By using the above configuration, by moving the outer guide plates in the horizontal direction while the outer guide plates suppress widening of the legs of hairpin-shaped heat-exchanger tubes that extend in the up-down direction and are aligned at the regular pitch, lower end portions of the legs are lifted up by rollers that contact the upstream sides of the legs so as to face the insertion side. At this time, due to the bent portions contacting the stoppers, the hairpin-shaped heat-exchanger tubes rotate about the bent portions as the centers of rotation, and due to the up-down movement apparatus finally raising the outer guide plates, it is possible to change the orientation of the hairpin-shaped heat-exchanger tubes to the horizontal direction.

The alignment apparatus may also include an inner guide that is capable of moving horizontally and moving up and down together with the outer guide plates and is capable of advancing between the legs of the hairpin-shaped heat exchanger tubes at a position downstream of the outer guide plates.

With this configuration, since the outer sides of the legs of the hairpin-shaped heat-exchanger tubes are guided by the outer guide plates and the inner sides of the legs are guided by the inner guide, it is possible to accurately maintain the width of the legs.

The alignment apparatus may also include an upper surface guide that is capable of moving horizontally and moving up and down together with the outer guide plates and contacts, at a position downstream of the outer guide plates, upper surfaces of the legs of the hairpin-shaped heat exchanger tubes whose orientation has changed to the horizontal direction.

With this configuration, since the lower surfaces of the hairpin-shaped heat-exchanger tubes that have been oriented in the horizontal direction are contacted by the rollers and the upper surfaces are contacted by the upper surface guide, it is possible to accurately keep the heat-exchanger tubes horizontal.

Advantageous Effects of Invention

According to the alignment apparatus for hairpin-shaped heat-exchanger tubes according to the present invention, it is possible to suppress widening of the legs of hairpin-shaped heat-exchanger tubes and align the hairpin-shaped heat-exchanger tubes in the horizontal direction at the regular pitch between a bender and an insertion apparatus for hairpin-shaped heat-exchanger tubes.

BRIEF DESCRIPTION OF DRAWINGS

FIG. 11 is a plan view depicting a state where outer guide plates have been lowered to and advanced into a regular pitch alignment unit.

FIG. 12 is a diagram useful in explaining an operation of the orientation changing unit.

DESCRIPTION OF EMBODIMENTS

Alignment apparatuses for hairpin-shaped heat exchanger tubes (hereinafter, sometimes referred to simply as "alignment apparatuses") according to embodiments of the present invention will now be described with reference to the drawings.

Figure 1:
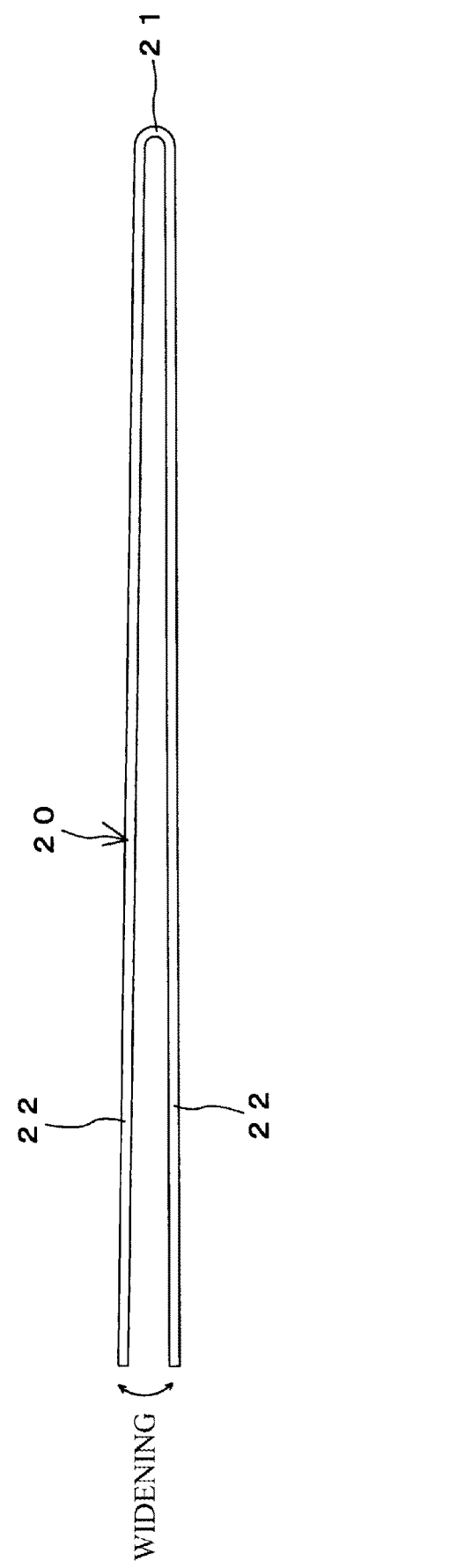
FIG. 1 is a plan view of a hairpin-shaped heat-exchanger tube.

First, in FIG. 1, a plan view of a hairpin-shaped heat exchanger tube is depicted.

The hairpin-shaped heat exchanger tube 20 is a metal tube that is made of a material with favorable thermal conductivity, such as copper tubing, and is bent into a U shape at a bent portion 21 in the center.

Since the hairpin-shaped heat exchanger tube 20 is bent into a U shape by a bender (not illustrated), it is common for legs 22 of the hairpin-shaped heat exchanger tube 20 to widen due to elastic forces. Bending and twisting may also occur. For this reason, when conveying from the bender to an insertion apparatus that inserts the tubes into a fin stack, it is necessary to align the tubes using an alignment apparatus such as those in the present embodiments.

Figure 2:
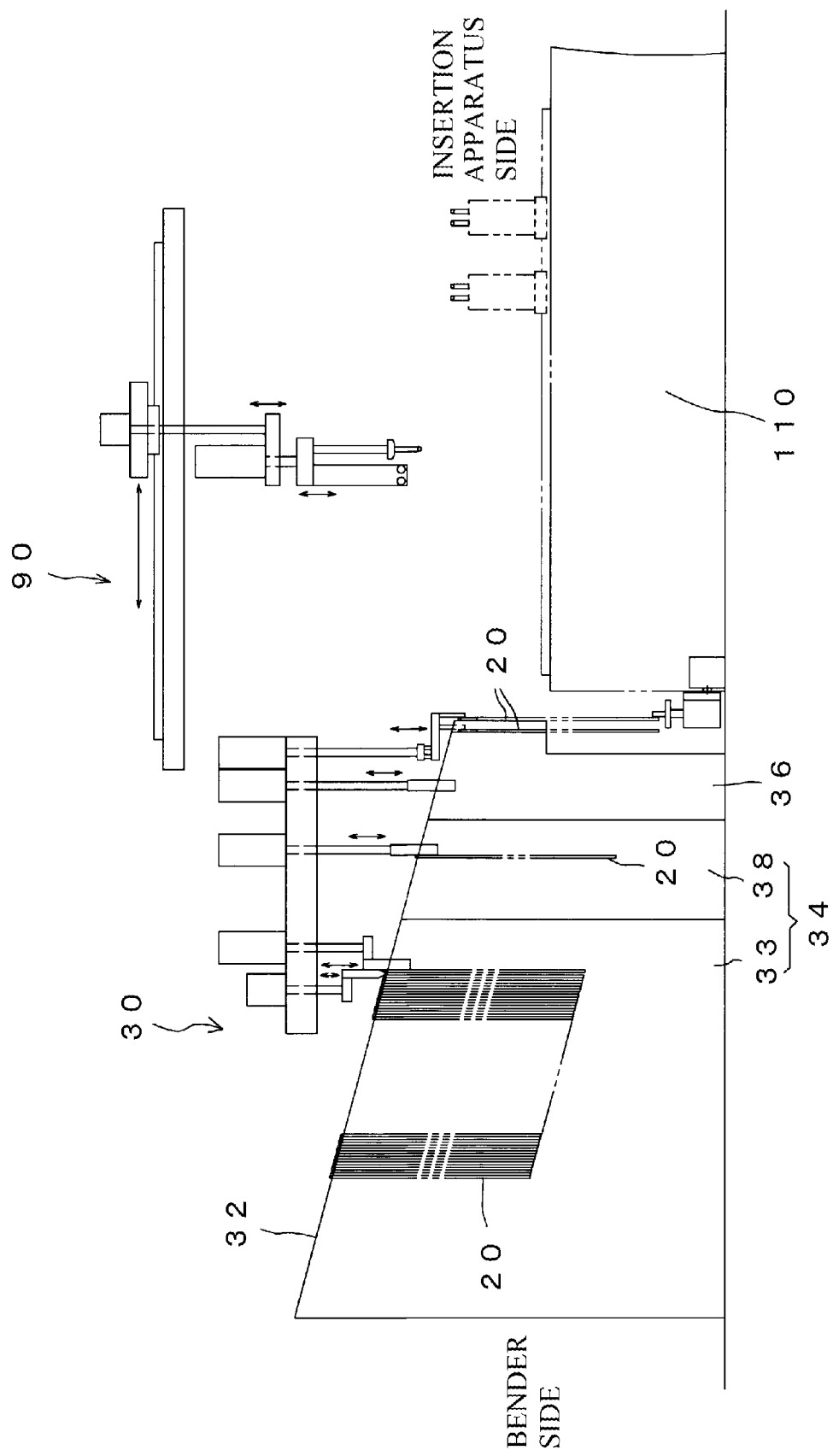
FIG. 2 is a side view depicting the overall configuration of an alignment apparatus for hairpin-shaped heat-exchanger tubes.

FIG. 2 is a side view depicting the overall configuration of an alignment apparatus.

The alignment apparatus according to the present embodiment includes an alignment unit 30 that aligns the hairpin-shaped heat-exchanger tubes 20 and an orientation changing unit 90 that changes the orientation of the hairpin-shaped heat-exchanger tubes 20 aligned by the alignment unit 30 so as to become oriented in the horizontal direction.

The alignment unit 30 aligns the hairpin-shaped heat-exchanger tubes 20 with a pitch that matches the pitch of the through-holes of the fin stack. The orientation changing unit 90 orients the hairpin-shaped heat-exchanger tubes 20, which have been aligned, in the horizontal direction and also matches the widths of the widened legs 22 to the pitch of the through-holes.

Note that although FIG. 2 depicts a guide apparatus 110, which holds the hairpin-shaped heat-exchanger tubes 20 that have been oriented in the horizontal direction, below the orientation changing unit 90, it is assumed here that the guide apparatus is not included in the alignment apparatus according to the present invention.

Alignment Unit

Figure 3:
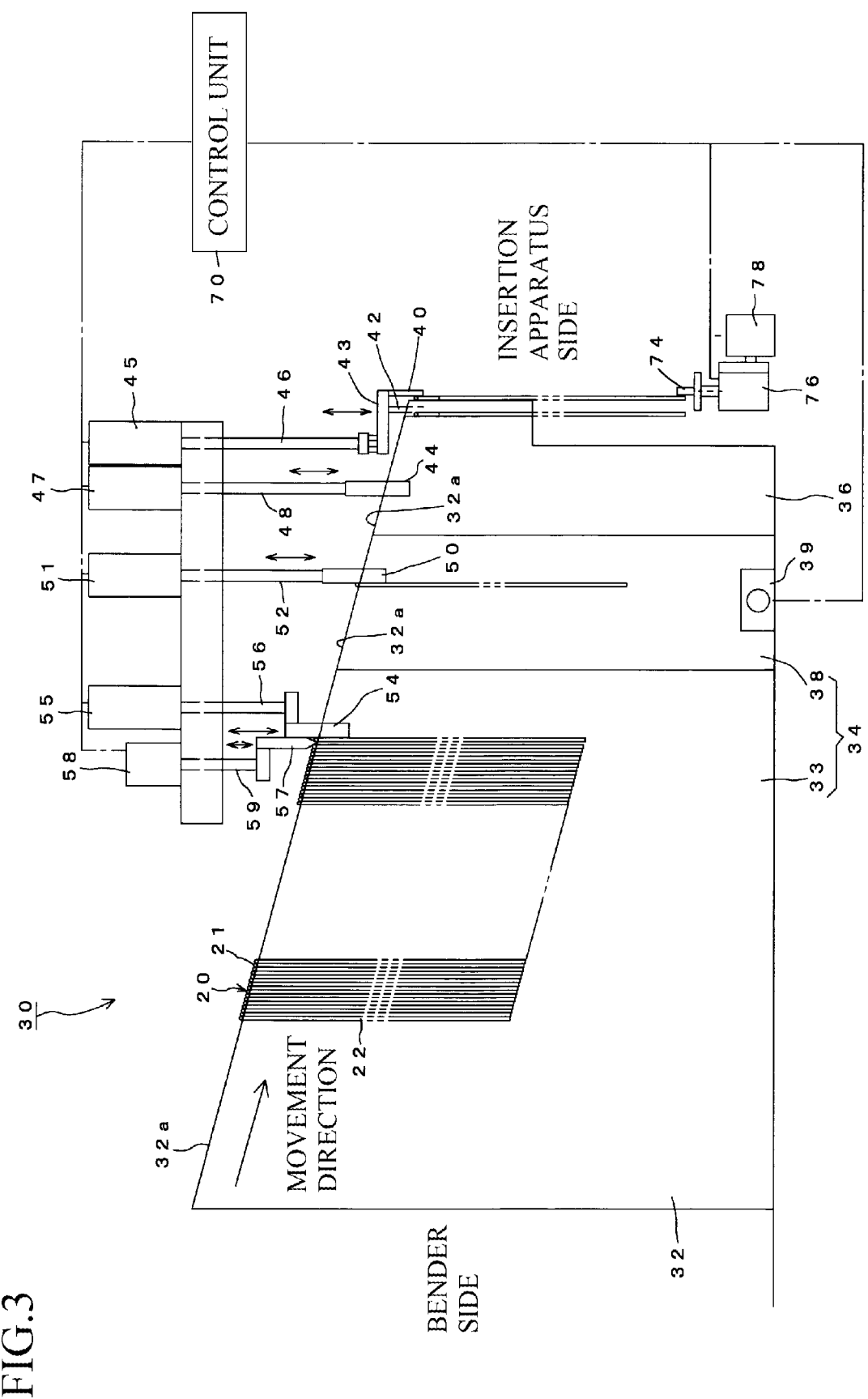
FIG. 3 is a side view of an alignment unit.
Figure 4:
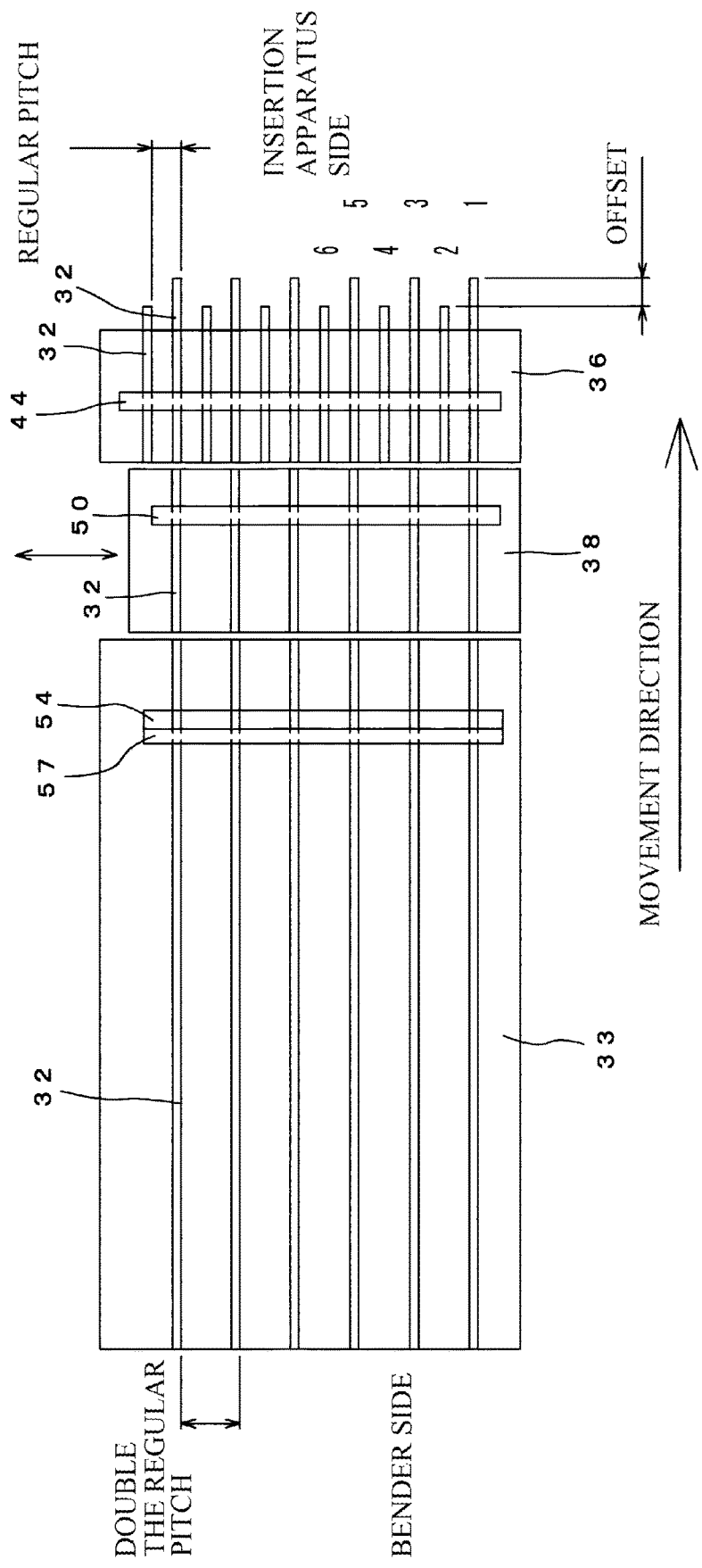
FIG. 4 is a plan view of the alignment unit.

FIG. 3 is a side view of an alignment unit realized by arrangement plates, and FIG. 4 is a schematic plan view of the alignment unit.

The alignment unit 30 is equipped with a plurality of arrangement plates 32 that are aligned in the width direction.

The arrangement plates 32 each include an inclined portion 32a whose upper surface becomes lower toward the insertion apparatus side. Note that in the following description, the lower side of an inclined portion 32a, that is, the insertion apparatus side, is also referred to as the "downstream side" and the higher side of an inclined portion 32a, that is, the bender side, is referred to as the "upstream side".

The hairpin-shaped heat-exchanger tubes 20 are arranged by hanging the bent portions 21 on the inclined portions 32a of the arrangement plates 32. When a hairpin-shaped heat-exchanger tube 20 has been arranged on an arrangement plate 32, the legs 22 become disposed on both the left and right sides of the arrangement plate 32.

On the upstream side, the intervals in the horizontal direction between the arrangement plates 32 is an interval that is four times the pitch (hereinafter referred to as the "regular pitch") of the through-holes of the fin stack into which the hairpin-shaped heat-exchanger tubes 20 are to be inserted. The plurality of arrangement plates 32 at this upstream side are referred to as the "wide pitch alignment unit 34".

On the downstream side, the intervals in the horizontal direction between the arrangement plates 32 is double the regular pitch. The plurality of arrangement plates at the downstream end are referred to as the "regular pitch alignment unit 36".

That is, in the regular pitch alignment unit 36, double the number of arrangement plates 32 in the wide pitch alignment unit 34 are disposed so as to be aligned in the horizontal direction.

The wide pitch alignment unit 34 includes a movable wide pitch alignment unit 38 that is capable of moving along the direction in which the arrangement plates 32 are aligned and a fixed wide pitch alignment unit 33 that is fixed and does not move along the direction in which the arrangement plates 32 are aligned.

The movable wide pitch alignment unit 38 is provided with the same number of arrangement plates 32 as the fixed wide pitch alignment unit 33, and the intervals between the arrangement plates 32 are four times the regular pitch, that is, the same as the intervals in the fixed wide pitch alignment unit 33.

The movable wide pitch alignment unit 38 is provided so as to be capable of moving the plurality of arrangement plates 32 at the same time in the horizontal direction. The movable wide pitch alignment unit 38 uses a linear movement apparatus 39, such as a combination of a ball screw and a motor or an air cylinder, and is capable of moving the plurality of arrangement plates 32 in the horizontal direction.

When viewed from the side, the inclined portions 32a of the arrangement plates 32 disposed in the regular pitch alignment unit 36, the fixed wide pitch alignment unit 33, and the movable wide pitch alignment unit 38 are continuous.

When the hairpin-shaped heat-exchanger tubes 20 are arranged on the inclined portions 32a of the fixed wide pitch alignment unit 33, unless some kind of stopper (described later) is present, the hairpin-shaped heat-exchanger tubes 20 will slide down under their own weight from the fixed wide pitch alignment unit 33 as far as the regular pitch alignment unit 36.

The length by which the plurality of arrangement plates 32 protrude toward the insertion apparatus at the regular pitch alignment unit 36 is set so as to differ for alternating arrangement plates 32.

In the embodiment depicted in FIG. 4, the arrangement plates 32 have been assigned numbers in order so that the arrangement plate 32 positioned at the bottom in the drawing is number "1", the arrangement plate 32 positioned above it is number "2", and so on. The arrangement plates 32 that have been assigned odd numbers protrude further toward the insertion apparatus than the arrangement plates that have been assigned even numbers.

At the regular pitch alignment unit 36, first stoppers 40 and second stoppers 42 are positioned on a downstream side of the hairpin-shaped heat-exchanger tubes 20 that have been arranged on the respective arrangement plates 32 of the regular pitch alignment unit 36 so as to support and stop the hairpin-shaped heat-exchanger tubes 20 at those positions.

The first stoppers 40 are provided so as to be positioned at downstream ends of the odd-numbered arrangement plates 32 of the regular pitch alignment unit 36 and stop the hairpin-shaped heat-exchanger tubes 20 that have been arranged on the odd-numbered arrangement plates 32.

The second stoppers 42 are provided so as to be positioned at downstream ends of the even-numbered arrangement plates 32 of the regular pitch alignment unit 36 and stop the hairpin-shaped heat-exchanger tubes 20 disposed on the even-numbered arrangement plates 32.

Since the odd-numbered arrangement plates 32 in the present embodiment protrude a longer distance downstream than the even-numbered arrangement plates 32, the first stoppers 40 are positioned further downstream than the second stoppers 42.

The first stoppers 40 and the second stoppers 42 are capable of being moved up and down by an up-down movement apparatus. In the present embodiment, a cylinder apparatus 45, such as an air cylinder, is used as the up-down movement apparatus.

The cylinder apparatus 45 is disposed above the first stoppers 40 and the second stoppers 42 with a rod 46 that is oriented downward. A base portion 43, to which upper end portions of both the first stoppers 40 and the second stoppers 42 are attached, is provided at a lower end portion of the rod 46 of the cylinder apparatus 45.

With this configuration, when the cylinder apparatus 45 is driven, the first stoppers 40 and the second stoppers 42 move up and down at the same time.

In addition, a fifth stopper 44 for controlling movement of the hairpin-shaped heat-exchanger tubes 20 toward the first stoppers 40 and the second stoppers 42 is disposed upstream of the second stoppers 42 in the regular pitch alignment unit 36.

Above the fifth stopper 44, a cylinder apparatus 47 is disposed with a rod 48 facing downward. An upper end portion of the fifth stopper 44 is attached to a lower end portion of the rod 48.

By driving the cylinder apparatus 47, the fifth stopper 44 is moved up and down.

A fourth stopper 50 for controlling movement of the hairpin-shaped heat-exchanger tubes 20 toward the regular pitch alignment unit 36 is provided in the movable wide pitch alignment unit 38.

Above the fourth stopper 50, a cylinder apparatus 51 is disposed with a rod 52 oriented downward. An upper end portion of the fourth stopper 50 is attached to a lower end portion of the rod 52.

By driving the cylinder apparatus 51, the fourth stopper 50 is moved up and down.

On the inclined portions 32a of the arrangement plates 32 in the fixed wide pitch alignment unit 33, a plurality of hairpin-shaped heat-exchanger tubes 20 that have been sent from the bender are disposed per arrangement plate 32.

At the fixed wide pitch alignment unit 33, a mechanism is required for feeding the plurality of hairpin-shaped heat-exchanger tubes 20 on each arrangement plate 32 downstream one at a time.

For this reason, a third stopper 54 and a separator 57 are provided in the fixed wide pitch alignment unit 33.

The third stopper 54 is disposed at a position that contacts the downstream side of a hairpin-shaped heat-exchanger tube 20 positioned closest to the downstream side out of the plurality of hairpin-shaped heat-exchanger tubes 20 disposed on the respective arrangement plates 32 in the fixed wide pitch alignment unit 33.

The separator 57 is disposed upstream of these hairpin-shaped heat-exchanger tubes 20 that is positioned furthest downstream. On an upstream side of the third stopper 54, the separator 57 advances between the hairpin-shaped heat-exchanger tube 20 positioned at the front on the downstream side out of the plurality of hairpin-shaped heat-exchanger tubes 20 disposed on the respective arrangement plates 32 and the hairpin-shaped heat-exchanger tubes 20 aligned to the rear so as to be capable of stopping the hairpin-shaped heat-exchanger tubes 20 that are aligned to the rear at this position.

Above the third stopper 54, a cylinder apparatus 55 is disposed with a rod 56 oriented downward. An upper end portion of the third stopper 54 is attached to a lower end portion of the rod 56.

By driving the cylinder apparatus 55, the third stopper 54 is moved up and down.

Above the separator 57, a cylinder apparatus 58 is disposed with a rod 59 oriented downward. An upper end portion of the separator 57 is attached to a lower end portion of the rod 59.

By driving the cylinder apparatus 58, the separator 57 is moved up and down.

Figure 5:
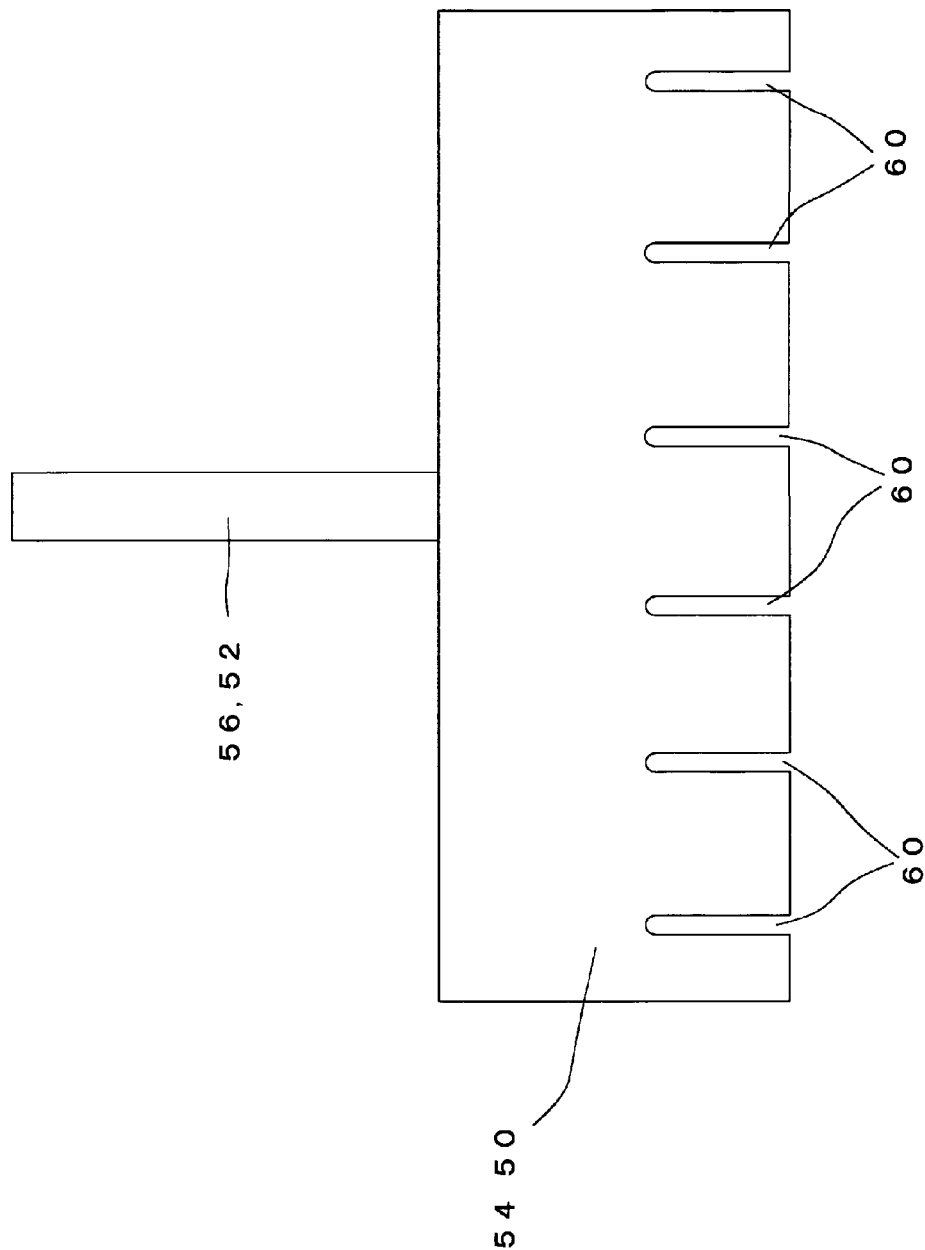
FIG. 5 is a front view of a third stopper and a fourth stopper.

FIG. 5 is a front view depicting the third and fourth stoppers.

As depicted in FIG. 5, the third and fourth stoppers 54 and 50 are constructed of plate-like members formed with the same number of slits 60, in which the upper parts of the arrangement plates 32 are capable of advancing, as the arrangement plates 32 in the fixed wide pitch alignment unit 33 and the movable wide pitch alignment unit 38. When the arrangement plates 32 support the hairpin-shaped heat-exchanger tubes 20 at the respective positions, by lowering the third and fourth stoppers 54 and 50 until the arrangement plates 32 advance into the slits 60, it is possible to stop movement of the hairpin-shaped heat-exchanger tubes 20 at the respective positions.

Figure 6:
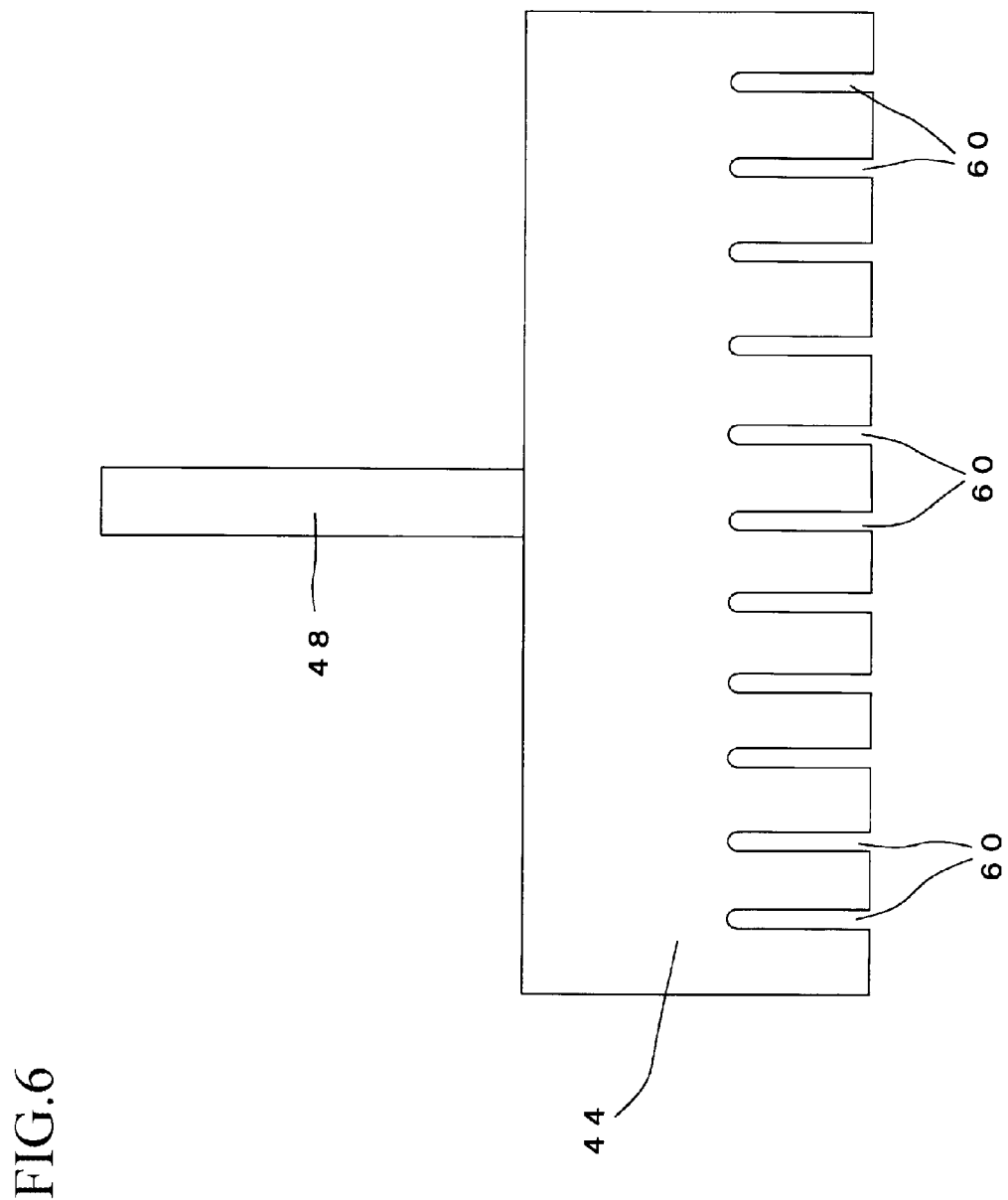
FIG. 6 is a front view of a fifth stopper.

FIG. 6 is a front view depicting the fifth stopper.

As depicted in FIG. 6, the fifth stopper 44 is constructed of a plate-like member in which the same number of slits 60, in which the upper parts of the arrangement plates 32 are capable of advancing, as the arrangement plates 32 in the regular pitch alignment unit 36 are formed. That is, the number of slits in the fifth stopper 44 is double the number of slits 60 in the third and fourth stoppers.

By lowering the fifth stopper 44 until the arrangement plates 32 advance into the slits 60, it is possible to stop movement of the hairpin-shaped heat-exchanger tubes 20 that have moved onto the odd-numbered arrangement plates 32 and movement of the hairpin-shaped heat-exchanger tubes 20 that have moved onto the even-numbered arrangement plates 32.

Figure 7:
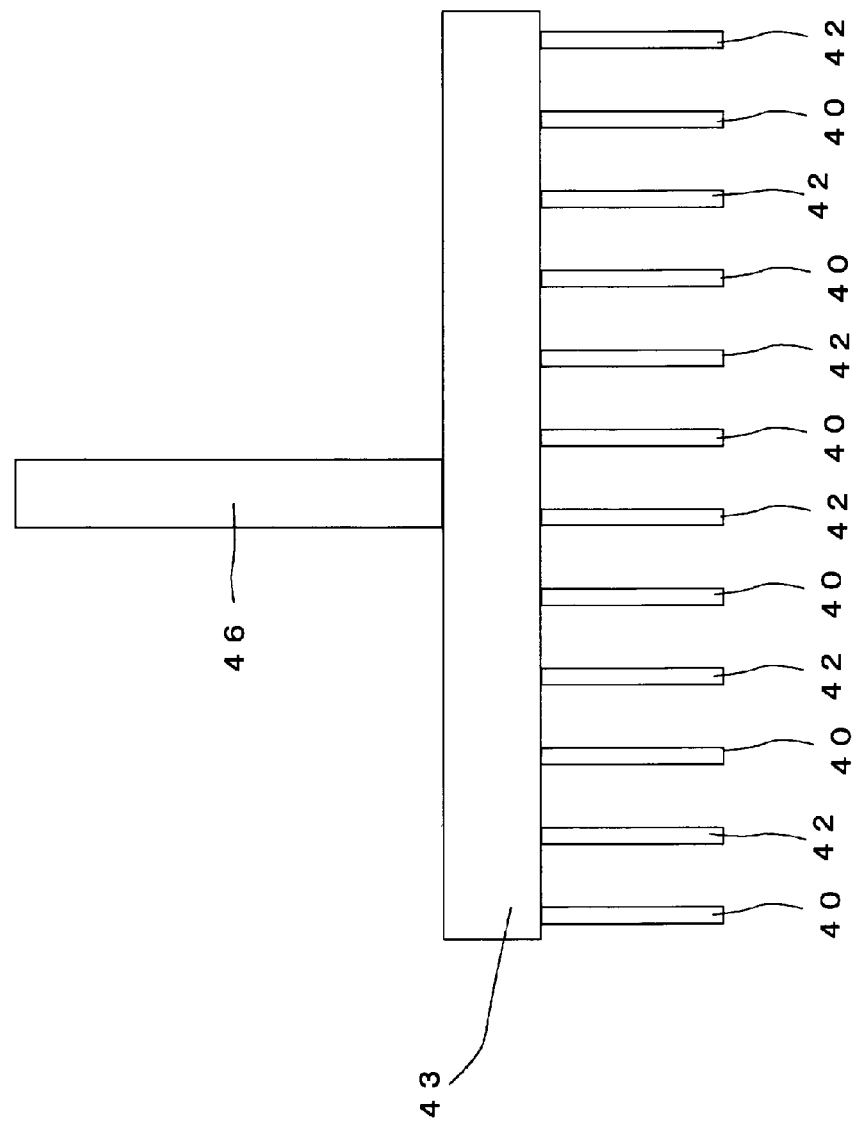
FIG. 7 is a front view of a first stopper and a second stopper.

FIG. 7 is a front view of the first stoppers and the second stoppers.

The first stoppers 40 and the second stoppers 42 are cylindrical members that are attached to the lower surface of the base portion 43 so as to extend downward.

The widths (i.e., the diameters of the cylinders) of the first stoppers 40 and the second stoppers 42 are provided so as to be capable of being housed inside the bent portions 21 of the hairpin-shaped heat-exchanger tubes 20. That is, the diameters of the cylinders that construct the first stoppers 40 and the second stoppers 42 are constructed so as to be narrower than the diameter of the bent portions 21.

By using this configuration, as described later, when the orientation of the hairpin-shaped heat-exchanger tubes 20 is changed by the orientation changing unit 90, it is possible to easily change the orientation to the horizontal direction by having the bent portions 21 catch on the first stoppers 40 and the second stoppers 42.

An upstream-side surface of each first stopper 40 contacts the downstream-side front end portion of an odd-numbered arrangement plate 32 of the regular pitch alignment unit 36.

With this configuration, the first stoppers 40 contact the downstream-side end surfaces of the bent portions 21 of the hairpin-shaped heat-exchanger tubes 20 that have moved on the odd-numbered arrangement plates 32 and stop the hairpin-shaped heat-exchanger tubes 20 that have moved on the arrangement plates 32.

Since the second stoppers 42 move up and down together with the first stoppers 40, when the first stoppers 40 are disposed at the downstream-side end portions of the odd-numbered arrangement plates 32, the second stoppers 42 contact the downstream-side end surfaces of the even-numbered arrangement plates 32.

The second stoppers 42 contact the downstream-side end surfaces of the bent portions 21 of the hairpin-shaped heat-exchanger tubes 20 that have moved on the even-numbered arrangement plates 32 and stop the hairpin-shaped heat-exchanger tubes 20 that have moved on the arrangement plates 32.

The separator 57 according to the present embodiment is a plate-like member in which slits 60 into which the arrangement plates 32 are capable of advancing are not provided (a front view is not depicted). However, the separator 57 is formed with a lower end portion that is tapered so as to be capable of advancing between the hairpin-shaped heat-exchanger tubes 20 that are closest to the downstream end of the fixed wide pitch alignment unit 33 and the heat-exchanger tubes 20 that are second closest to the downstream end. The front end portion of the separator 57 contacts the inclined portions 32a that are the upper surfaces of the arrangement plates 32.

An anti-swing stopper 74 that stops swinging of the hairpin-shaped heat-exchanger tubes 20 disposed on the arrangement plates 32 in the regular pitch alignment unit 36 is provided below the regular pitch alignment unit 36.

The anti-swing stopper 74 contacts lower end portions of the hairpin-shaped heat-exchanger tubes 20 to stop the hairpin-shaped heat-exchanger tubes 20 swinging when the hairpin-shaped heat-exchanger tubes 20 have moved down the odd-numbered arrangement plates 32 and been stopped by the first stoppers 40.

The anti-swing stopper 74 includes an up-down movement apparatus 76 that moves the anti-swing stopper 74 up and down and a linear movement apparatus 78 that moves the anti-swing stopper 74 in the horizontal direction.

Cylinder apparatuses, such as air cylinders, can be used as the up-down movement apparatus 76 and the linear movement apparatus 78.

By driving the up-down movement apparatus 76, it is possible to move the anti-swing stopper 74 between a position that contacts the downstream-side surfaces of the hairpin-shaped heat-exchanger tubes 20 and a position that does not contact the hairpin-shaped heat-exchanger tubes 20 (a position that is below the lower end portions of the hairpin-shaped heat-exchanger tubes 20).

By driving the linear movement apparatus 78, it is possible to move the anti-swing stopper 74 between downstream-side surfaces of the hairpin-shaped heat-exchanger tubes 20 that are contacted by the first stoppers 40 and downstream-side surfaces of the hairpin-shaped heat-exchanger tubes 20 that are contacted by the second stoppers 42.

Also provided is a control unit 70 that controls the operation of the linear movement apparatus 39 that horizontally moves the movable wide pitch alignment unit 38, the cylinder apparatuses 45, 47, 51, 55, and 58, and the up-down movement apparatus 76 and linear movement apparatus 78 of the anti-swing stopper 74. The control unit 70 is composed of a CPU and a memory, with a control program for performing operation control of the linear movement apparatus 39, the cylinder apparatuses 45, 47, 51, 55, and 58, the up-down movement apparatus 76, and the linear movement apparatus 78 being stored in the memory. The CPU reads the control program from the memory and performs operation control of the various structures in keeping with the control program.

Next, the operation of the alignment unit will be described.

First, a step of disposing the hairpin-shaped heat-exchanger tubes 20 on the odd-numbered arrangement plates 32 of the regular pitch alignment unit 36 will be described.

The first to fifth stoppers 40, 42, 54, 50, and 44 are placed in the lowered state, and in this state, the hairpin-shaped heat-exchanger tubes 20 that have been formed by the bender are sent to the arrangement plates 32 of the fixed wide pitch alignment unit 33.

The plurality of hairpin-shaped heat-exchanger tubes 20 that are fed to the fixed wide pitch alignment unit 33 are held by the third stopper 54 at that position so as to not move further downstream.

Next, the control unit 70 lowers the separator 57 which advances between the heat-exchanger tubes 20 that are closest to the downstream side of the fixed wide pitch alignment unit 33 and the hairpin-shaped heat-exchanger tubes 20 that are second closest to the downstream side. By doing so, the hairpin-shaped heat-exchanger tubes 20 positioned closest to the downstream side are separated from the hairpin-shaped heat-exchanger tubes 20 that are further upstream.

Next, the control unit 70 drives the cylinder apparatus 55 to raise the third stopper 54. When this happens, only the hairpin-shaped heat-exchanger tubes 20 positioned furthest downstream in the fixed wide pitch alignment unit 33 move under their own weight toward the movable wide pitch alignment unit 38.

After the third stopper 54 has been raised, the control unit 70 immediately lowers the third stopper 54. The control unit 70 then drives the cylinder apparatus 58 to raise the separator 57, the hairpin-shaped heat-exchanger tubes 20 that were stopped by the separator 57 move under their own weight, and stop on coming into contact with the third stopper 54.

In the movable wide pitch alignment unit 38, the fourth stopper 50 stops the hairpin-shaped heat-exchanger tubes 20 that have moved over from the wide pitch alignment unit 34.

If the control unit 70 drives the cylinder apparatus 51 to raise the fourth stopper 50 in a state where the respective arrangement plates 32 of the movable wide pitch alignment unit 38 match the positions of the odd-numbered arrangement plates 32 of the regular pitch alignment unit 36 as depicted in FIG. 4, the hairpin-shaped heat-exchanger tubes 20 disposed on the movable wide pitch alignment unit 38 will move under their own weight to the odd-numbered arrangement plates 32 of the regular pitch alignment unit 36.

After raising the fourth stopper 50 to allow the hairpin-shaped heat-exchanger tubes 20 to move, the control unit 70 drives the cylinder apparatus 51 to lower the fourth stopper 50.

The hairpin-shaped heat-exchanger tubes 20 that have moved to the odd-numbered arrangement plates 32 of the regular pitch alignment unit 36 stop on coming into contact with the fifth stopper 44.

The control unit 70 then drives the cylinder apparatus 47 to raise the fifth stopper 44. When this happens, the hairpin-shaped heat-exchanger tubes 20 that were stopped by the fifth stopper 44 move under their own weight to the downstream side front end portions of the odd-numbered arrangement plates 32 and stop on coming into contact with the first stoppers 40.

Note that after raising the fifth stopper 44 to allow the hairpin-shaped heat-exchanger tubes 20 to move, the control unit 70 drives the cylinder apparatus 47 to lower the fifth stopper 44.

Next, a step of disposing hairpin-shaped heat-exchanger tubes 20 on the even-numbered arrangement plates 32 of the regular pitch alignment unit 36 will be described.

The control unit 70 lowers the separator 57, which advances between the heat-exchanger tubes 20 that are closest to the downstream side of the fixed wide pitch alignment unit 33 and the hairpin-shaped heat-exchanger tubes 20 that are second closest to the downstream side. By doing so, the hairpin-shaped heat-exchanger tubes 20 positioned closest to the downstream side are separated from the hairpin-shaped heat-exchanger tubes 20 that are further upstream.

Next, the control unit 70 drives the cylinder apparatus 55 to raise the third stopper 54. When this happens, only the hairpin-shaped heat-exchanger tubes 20 positioned furthest downstream in the fixed wide pitch alignment unit 33 move under their own weight toward the movable wide pitch alignment unit 38.

After the third stopper 54 has been raised, the control unit 70 immediately lowers the third stopper 54. The control unit 70 then drives the cylinder apparatus 58 to raise the separator 57, the hairpin-shaped heat-exchanger tubes 20 that were stopped by the separator 57 move under their own weight, and stop on coming into contact with the third stopper 54.

In the movable wide pitch alignment unit 38, the fourth stopper 50 stops the hairpin-shaped heat-exchanger tubes 20 that have moved over from the wide pitch alignment unit 34.

Figure 8:
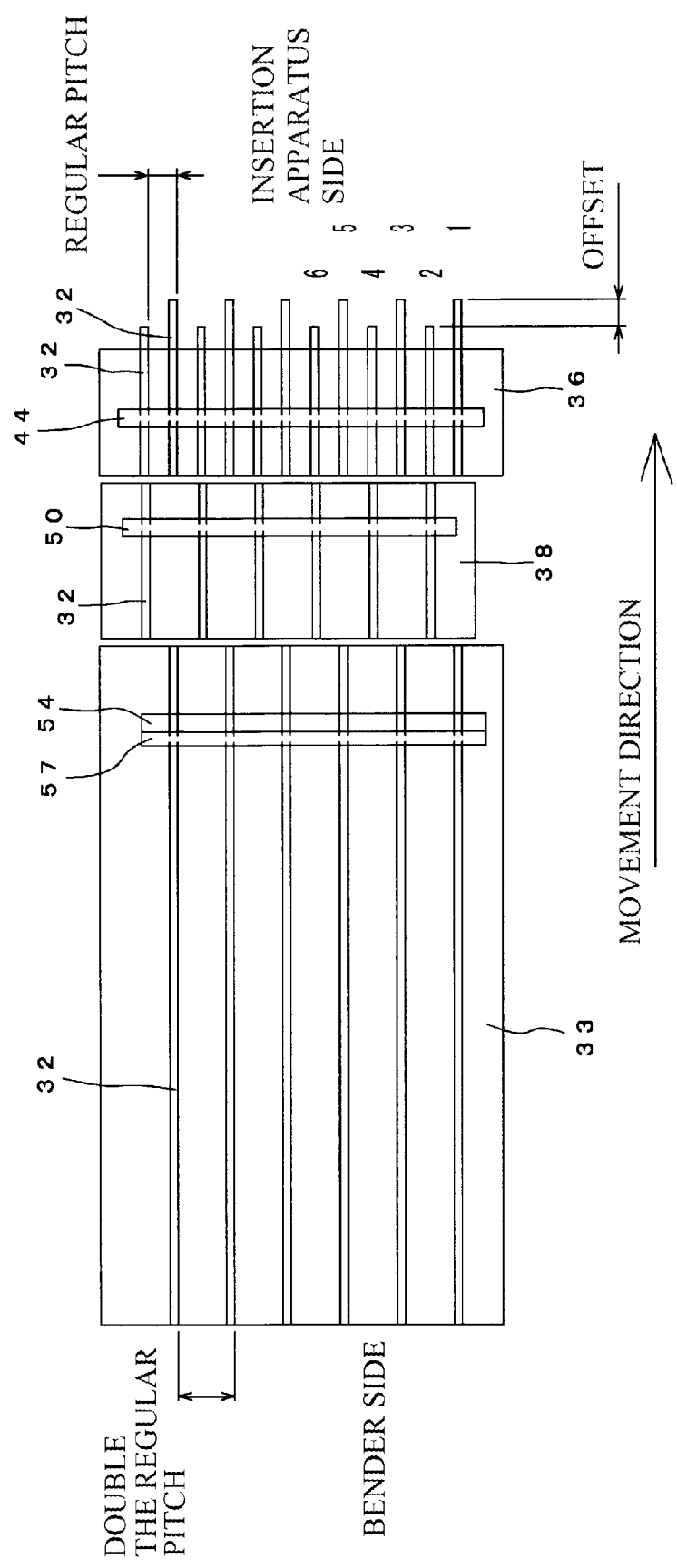
FIG. 8 is a plan view of a hairpin-shaped heat-exchanger tube alignment apparatus when a movable pitch alignment unit has moved.

After this, the control unit 70 drives the linear movement apparatus 39 to move the movable wide pitch alignment unit 38 to a position where the arrangement plates 32 of the movable wide pitch alignment unit 38 are lined up with the even-numbered arrangement plates 32 of the regular pitch alignment unit 36 as depicted in FIG. 8.

After movement of the movable wide pitch alignment unit 38 has ended, once the control unit 70 has driven the cylinder apparatus 51 to raise the fourth stopper 50, the hairpin-shaped heat-exchanger tubes 20 disposed on the movable wide pitch alignment unit 38 move under their own weight to the even-numbered arrangement plates 32 of the regular pitch alignment unit 36.

After raising the fourth stopper 50 to allow the hairpin-shaped heat-exchanger tubes 20 to move, the control unit 70 drives the cylinder apparatus 51 to lower the fourth stopper 50.

The hairpin-shaped heat-exchanger tubes 20 that have moved to the even-numbered arrangement plates 32 of the regular pitch alignment unit 36 stop on coming into contact with the fifth stopper 44.

The control unit 70 then drives the cylinder apparatus 47 to raise the fifth stopper 44. When this happens, the hairpin-shaped heat-exchanger tubes 20 that were stopped by the fifth stopper 44 move under their own weight to the downstream side front end portions of the odd-numbered arrangement plates 32 and stop on coming into contact with the second stoppers 42.

Note that after raising the fifth stopper 44 to allow the hairpin-shaped heat-exchanger tubes 20 to move, the control unit 70 drives the cylinder apparatus 47 to lower the fifth stopper 44.

Figure 9:
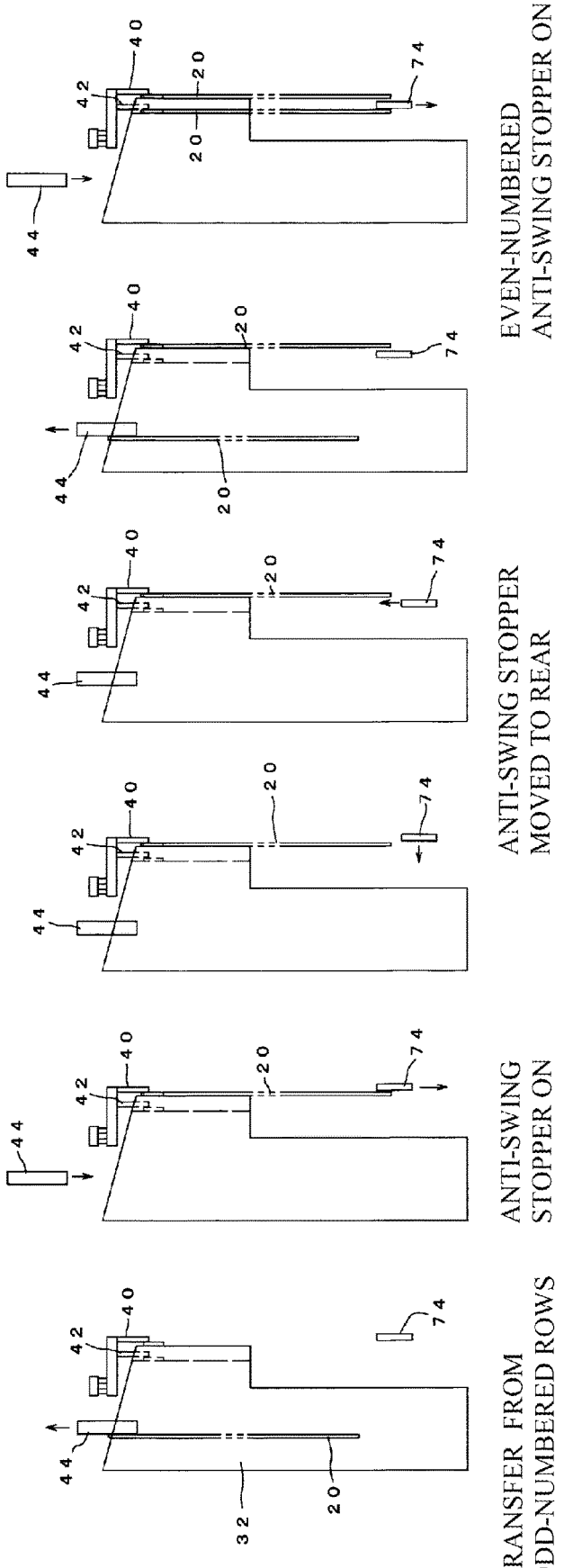
FIG. 9 is a diagram useful in explaining an operation of an anti-swing stopper.

Next, the operation of the anti-swing stopper 74 will be described with reference to FIG. 9. FIG. 9 illustrates only the operation of the regular pitch alignment unit 36.

FIG. 9A depicts when the control unit 70 raises the fifth stopper 44 to allow the hairpin-shaped heat-exchanger tubes 20 to move downward, in a case where the hairpin-shaped heat-exchanger tubes 20 have been disposed on the odd-numbered arrangement plates 32 of the regular pitch alignment unit 36.

In FIG. 9B, a state where the hairpin-shaped heat-exchanger tubes 20 have moved down the odd-numbered arrangement plates 32 and come into contact with both the first stoppers 40 and the anti-swing stopper 74 is depicted. At this time, the upstream side surface of the anti-swing stopper 74 is disposed so as to be at the same position as the upstream side surfaces of the first stoppers 40. When the odd-numbered hairpin-shaped heat-exchanger tubes 20 move to the most downstream position of the arrangement plates 32, since the upper portions of the hairpin-shaped heat-exchanger tubes 20 contact the first stoppers 40 and the lower portions also contact the anti-swing stopper 74, the legs 22 can be prevented from swinging as the legs 22 change from moving to stopping.

In FIG. 9C, the control unit 70 drives the cylinder apparatus 47 to lower the fifth stopper 44, drives the up-down movement apparatus 76 to lower the anti-swing stopper 74, and drives the linear movement apparatus 78 to move the anti-swing stopper 74 to the upstream side of the first stoppers 40.

Next, in FIG. 9D, the control unit 70 drives the up-down movement apparatus 76 to raise the anti-swing stopper 74 to a position that is capable of contacting the lower portions of the hairpin-shaped heat-exchanger tubes 20 on the even-numbered arrangement plates 32.

FIG. 9E depicts when the control unit 70 raises the fifth stopper 44 to allow the hairpin-shaped heat-exchanger tubes 20 to move downward, in a case where the hairpin-shaped heat-exchanger tubes 20 have been disposed on the even-numbered arrangement plates 32 of the regular pitch alignment unit 36.

Next, in FIG. 9F, a state where the hairpin-shaped heat-exchanger tubes 20 have moved on the even-numbered arrangement plates 32 and come into contact with the second stoppers 42 and the anti-swing stopper 74 is depicted. At this time, the upstream-side surface of the anti-swing stopper 74 is disposed at the same position as the upstream-side surfaces of the second stoppers 42. When the even-numbered hairpin-shaped heat-exchanger tubes 20 move to the most downstream position of the arrangement plates 32, since the upper portions of the hairpin-shaped heat-exchanger tubes 20 contact the second stoppers 42 and the lower portions also contact the anti-swing stopper 74, the legs 22 can be prevented from swinging as the legs 22 change from moving to stopping.

Note that the present embodiment described above is an arrangement where the odd-numbered arrangement plates 32 of the regular pitch alignment unit 36 extend further toward the insertion apparatus than the even-numbered arrangement plates 32. However, it is also possible for the even-numbered arrangement plates 32 to extend further toward the insertion apparatus than the odd-numbered arrangement plates 32.

With the alignment unit 30 according to the present embodiment, it is possible to dispose the hairpin-shaped heat-exchanger tubes 20 whose legs 22 have widened alternately at positions that are offset in the movement direction. This means that even when the hairpin-shaped heat-exchanger tubes 20 are disposed at the regular pitch, there will be no contact and/or interference between hairpin-shaped heat-exchanger tubes 20 that are adjacent.

Note that although the embodiment described above uses two different stopping positions for the hairpin-shaped heat-exchanger tubes 20 on the odd-numbered arrangement plates 32 and the even-numbered arrangement plates 32 in the regular pitch alignment unit 36, it is sufficient for hairpin-shaped heat-exchanger tubes 20 that are adjacent to not stop at the same position in the movement direction, and each arrangement plate 32 may use one of three possible stopping positions for the hairpin-shaped heat-exchanger tubes 20, for example.

Note also that although the wide pitch alignment unit 34 has the arrangement plates 32 disposed at intervals that are double the regular pitch alignment unit 36 in the embodiment described above, it is also possible for the interval of the arrangement plates 32 in the wide pitch alignment unit 34 to be an interval multiple of two times or higher the disposed interval in the regular pitch alignment unit 36.

In addition, in the embodiment described above, it is assumed that the wide pitch alignment unit 34 is composed of two structures that are the fixed wide pitch alignment unit 33 and the movable wide pitch alignment unit 38. However, the entire wide pitch alignment unit 34 may be provided so as to be capable of moving along the direction in which the arrangement plates 32 are aligned. In this case, the fourth stopper 50 does not need to be provided.

Orientation Changing Unit

Figure 10:
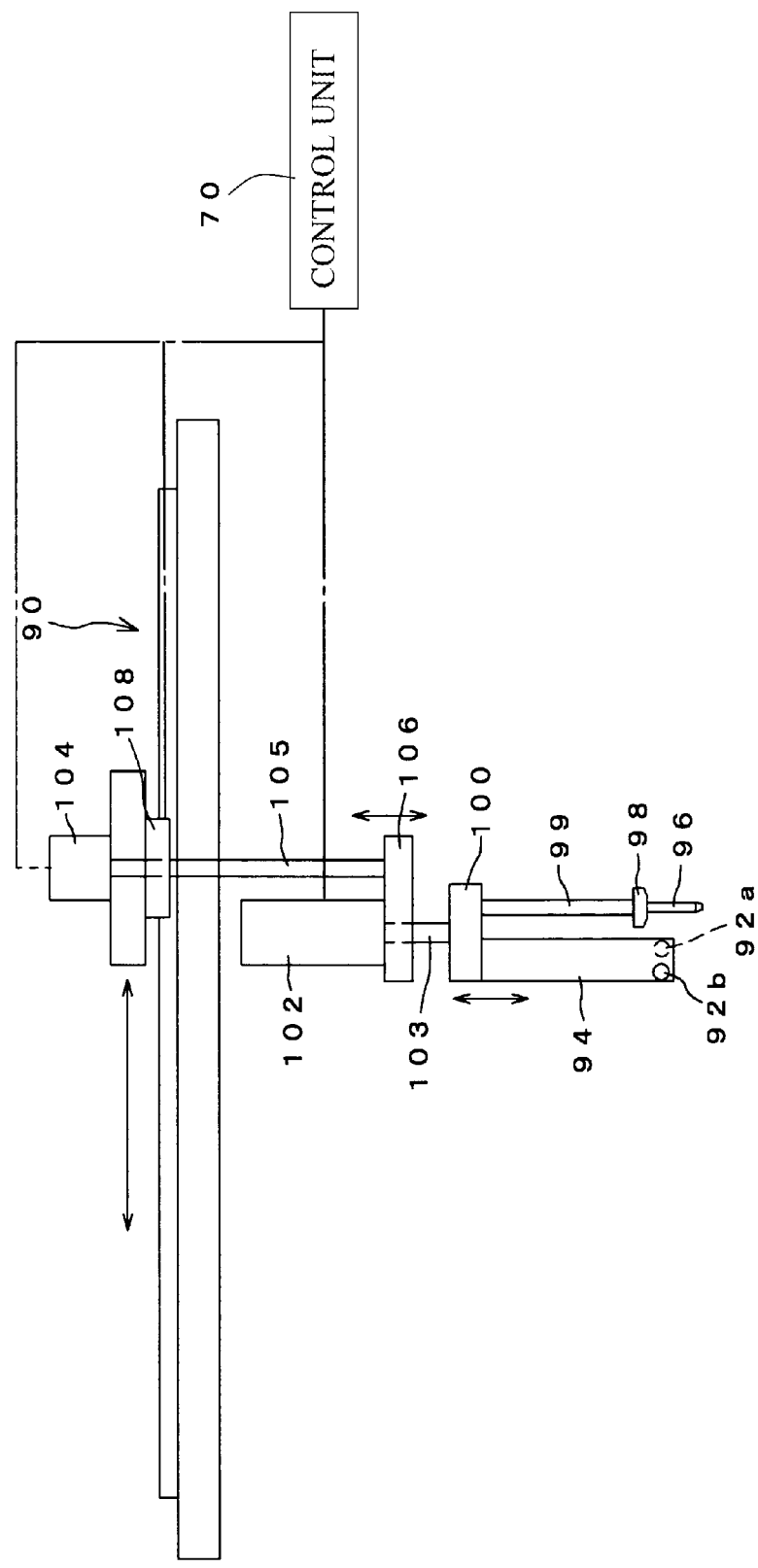
FIG. 10 is a side view of an orientation changing unit.

Next, the configuration of the orientation changing unit 90 will be described with reference to FIG. 10.

The orientation changing unit 90 includes outer guide plates 94, which are lowered from above one arrangement plate 32 and have rollers 92 that contact the upstream sides of the two legs 22 of one hairpin-shaped heat-exchanger tube 20, rod-like inner guides 96, which are disposed downstream of the outer guide plates 94 and protrude downward so as to advance between the two legs 22 when the orientation of the hairpin-shaped heat-exchanger tubes 20 has changed to the horizontal direction, and an upper surface guide 98 that is provided at upper end portions of the inner guides 96 and contacts the upper surfaces of the two legs 22 of the hairpin-shaped heat-exchanger tubes 20 when the orientation of the hairpin-shaped heat-exchanger tubes 20 has changed to the horizontal direction. An upper portion of the upper surface guide 98 is connected to a lower end portion of a rod 99 that extends in the up-down direction, and an upper end portion of the rod 99 is attached to a base portion 100.

Upper end portions of the outer guide plates 94 are also attached to the base portion 100. The base portion 100 is attached to a rod 103 of a cylinder apparatus 102, and moves up and down when the cylinder apparatus 102 is driven.

Due to the base portion 100 moving up and down, the inner guides 96, the upper surface guide 98, and the outer guide plates 94 integrally move up and down.

The cylinder apparatus 102 is also provided so as to be capable of being moved up and down by a cylinder apparatus 104. A lower end portion of a rod 105 of the cylinder apparatus 104 is attached to a mounting portion 106 on which the cylinder apparatus 102 is mounted, and by driving the cylinder apparatus 104, the inner guides 96, the upper surface guide 98, and the outer guide plates 94 move up and down with the cylinder apparatus 102 as a single structure.

The cylinder apparatus 104 is also provided so as to be capable of being moved in the horizontal direction by a linear movement apparatus 108. The linear movement apparatus 108 is capable of reciprocal movement in a direction from the bender toward the insertion apparatus.

The cylinder apparatuses 102 and 104 and the linear movement apparatus 108 are connected to the control unit 70, and have their operations controlled by the control unit 70.

FIG. 11 is a plan view of an outer guide apparatus.

The outer guide plates 94 are plate-like members with a thickness that is capable of advancing between the arrangement plates 32 and are disposed between the arrangement plates 32 and on the outside of the outermost arrangement plates 32 (that is, the arrangement plate 32 numbered "1" and the arrangement plate numbered "12").

A roller 92 is attached to the side surface of each outer guide plate 94 so that the rotational axis thereof is oriented in the width direction on the horizontal plane. The rollers 92 are provided at positions that contact the upstream sides of the hairpin-shaped heat-exchanger tubes 20 disposed on the arrangement plates 32 of the regular pitch alignment unit 36.

An outer guide plate 94 that advances between the arrangement plates 32 has a roller 92a that contacts one leg 22 of a hairpin-shaped heat-exchanger tube 20 disposed on an odd-numbered arrangement plate 32 provided on one surface and has a roller 92b that contacts one leg 22 of a hairpin-shaped heat-exchanger tube 20 disposed on an even-numbered arrangement plate 32 provided on the other surface on the opposite side.

The outer guide plates 94 also include plates that have a roller 92b that contacts one leg 22 of a hairpin-shaped heat-exchanger tube 20 disposed on an even-numbered arrangement plate 32 provided on one surface and a roller 92a that contacts one leg 22 of a hairpin-shaped heat-exchanger tube 20 disposed on an odd-numbered arrangement plate 32 provided on the other surface.

In this way, although the outer guide plates 94 that advance between the arrangement plates 32 have one of a roller 92a that faces an odd-numbered arrangement plate 32 on the surface and a roller 92b that faces an even-numbered arrangement plate 32 on the two respective surfaces, alternating outer guide plates 94 are disposed so that surfaces on which the rollers 92a and the rollers 92b are disposed are reversed.

That is, one outer guide plate 94 will come into contact with one of the legs 22 of an odd-numbered hairpin-shaped heat-exchanger tube 20 and one of the legs 22 of an even-numbered hairpin-shaped heat-exchanger tube 20.

Note that only a roller 92a that contacts one leg of a hairpin-shaped heat-exchanger tube 20 disposed on the arrangement plate 32 numbered "1" is provided on the outer guide plate 94 that is disposed on the outside of the arrangement plate 32 numbered "1".

Likewise, only a roller 92b that contacts one leg of a hairpin-shaped heat-exchanger tube 20 disposed on the arrangement plate 32 numbered "12" is provided on the outer guide plate 94 that is disposed on the outside of the arrangement plate 32 numbered "12".

By disposing the outer guide plates 94 between the arrangement plates 32 and on the outside of the outermost arrangement plates 32 in the width direction, it is possible, when the intervals between the legs 22 of the hairpin-shaped heat-exchanger tubes 20 have widened, to restrict such widening to the appropriate interval.

That is, the surfaces of the outer guide plates 94 that face an arrangement plate 32 contact the legs 22 and suppress the legs 22 to an appropriate interval from the outside. This means that it is possible to suppress the widening of the legs 22 of the hairpin-shaped heat-exchanger tubes 20 to an appropriate interval.

Figure 13:
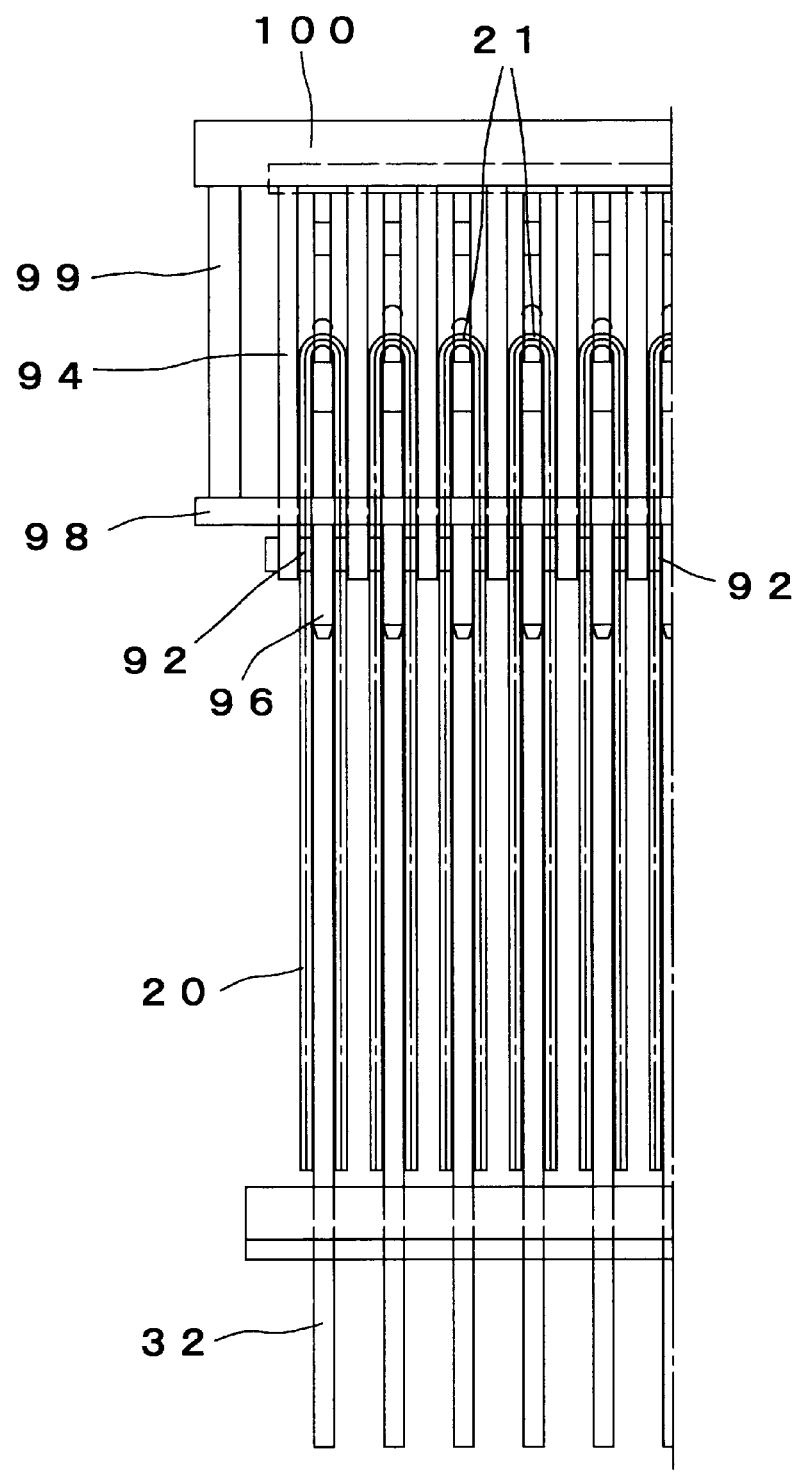
FIG. 13 is a front view of FIG. 12A.
Figure 14:
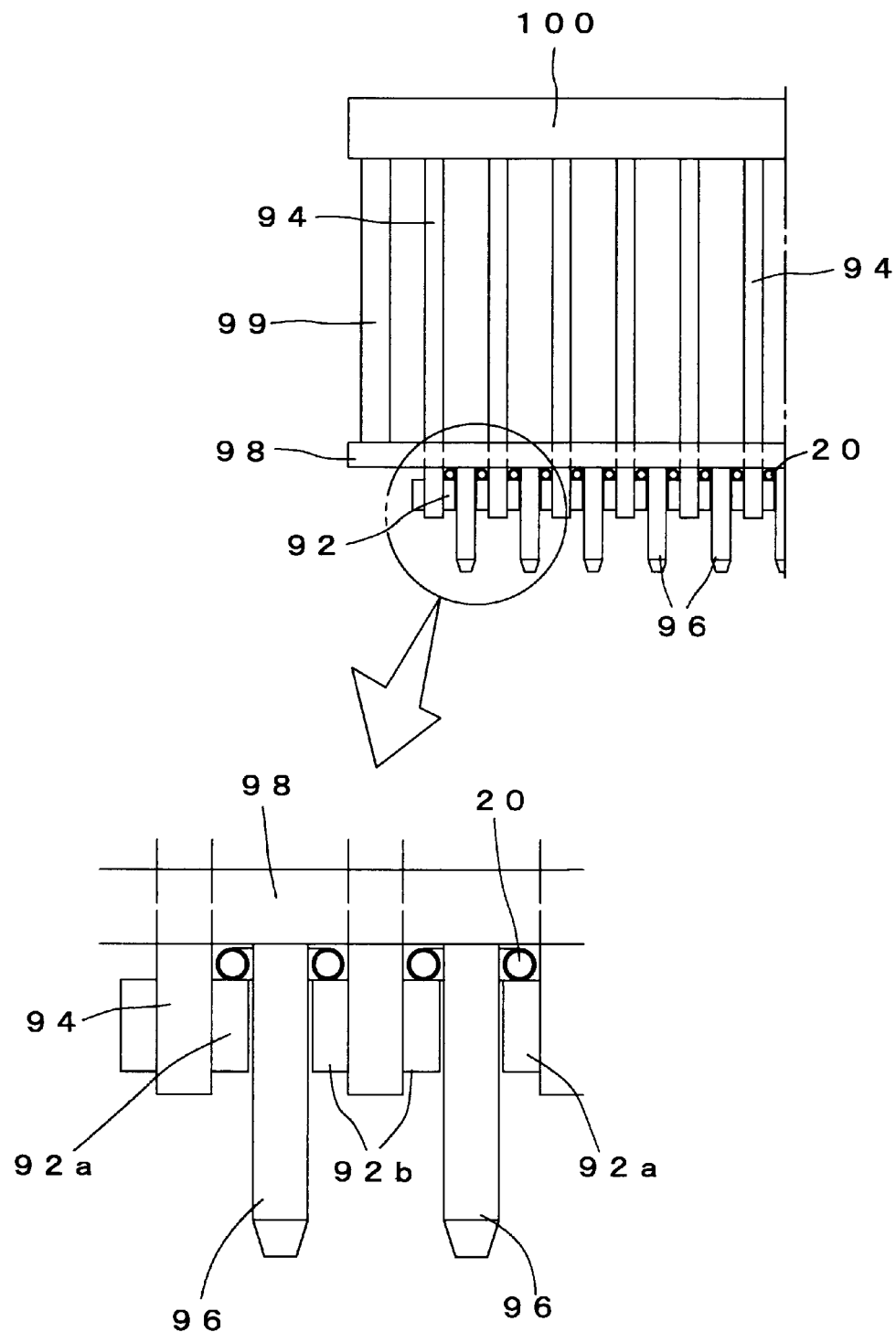
FIG. 14 is a front view of FIG. 12D.
Figure 15:
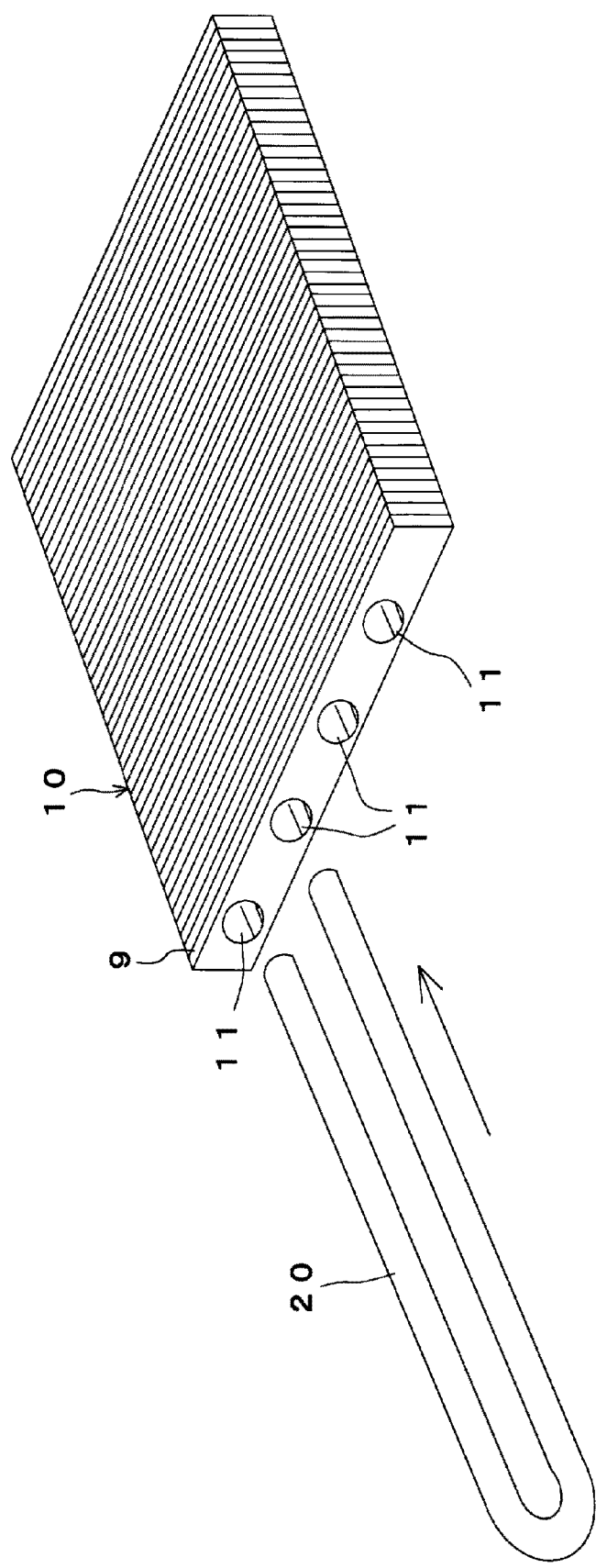
FIG. 15 is a diagram useful in explaining a state where the hairpin-shaped heat-exchanger tubes are inserted into a fin stack.
Figure 16:
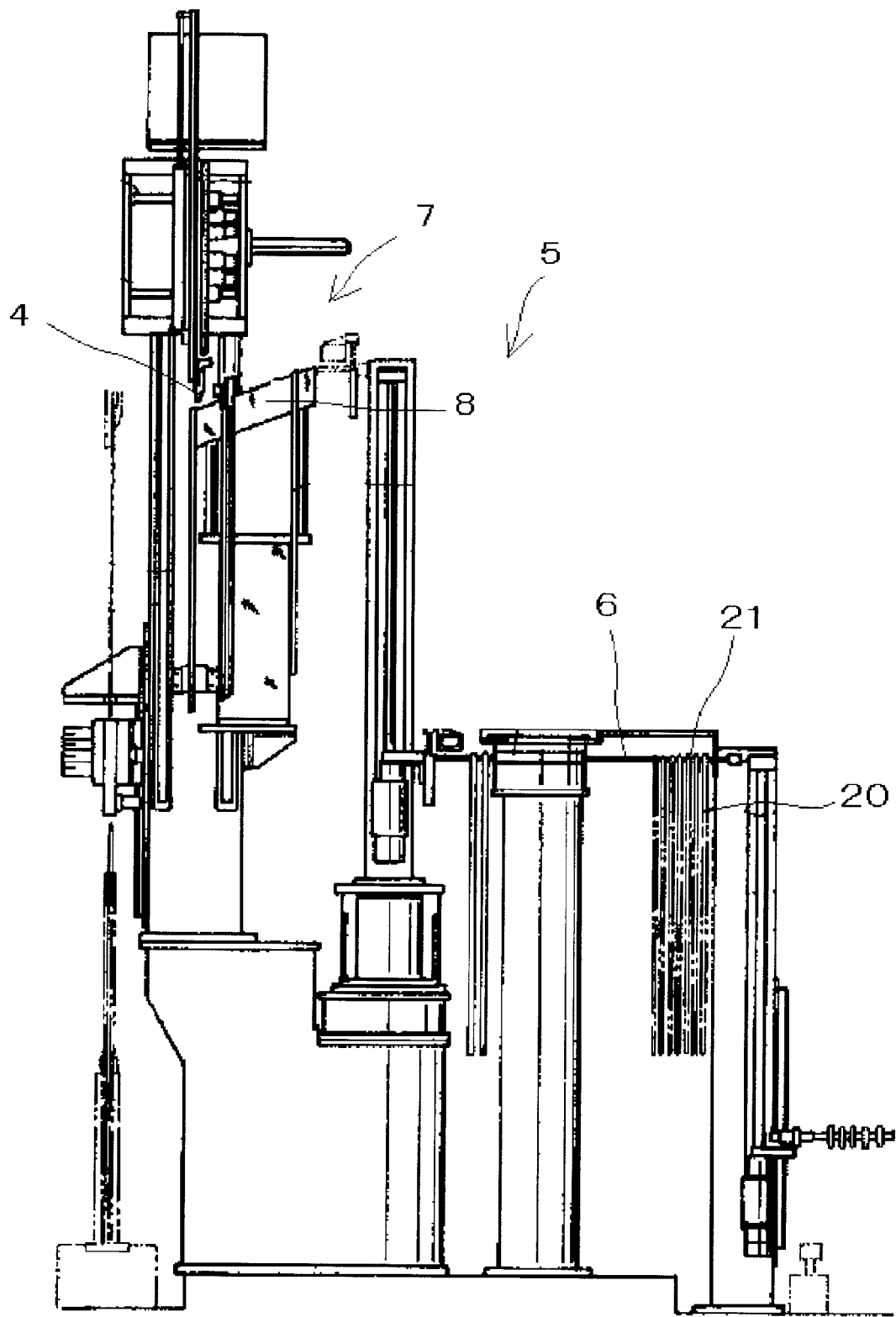
FIG. 16 is a diagram useful in explaining a conventional insertion apparatus for hairpin-shaped heat-exchanger tubes.

FIG. 12 depicts the operation of the orientation changing unit 90. A front view when looking from the direction A in FIG. 12A is given in FIG. 13 and a front view when looking from the direction A in FIG. 12D is given in FIG. 14.

Note that the operation depicted in FIG. 12 follows the operation depicted in FIG. 9. That is, the orientation changing unit 90 operates after the state depicted in FIG. 9F where hairpin-shaped heat-exchanger tubes 20 have been disposed on the odd-numbered arrangement plates 32, hairpin-shaped heat-exchanger tubes 20 have then been disposed on the even-numbered arrangement plates 32, and the anti-swing stopper 74 has then been separated from the hairpin-shaped heat-exchanger tubes 20 on the odd-numbered arrangement plates 32 and the hairpin-shaped heat-exchanger tubes 20 on the even-numbered arrangement plates 32.

In FIG. 12A, the cylinder apparatuses 102 and 104 are driven by the control unit 70 so that the orientation changing unit 90 is lowered from above the regular pitch alignment unit 36. The rollers 92a provided on the outer guide plates 94 then contact the surfaces on the upstream side of the hairpin-shaped heat-exchanger tubes 20 disposed on the odd-numbered arrangement plates 32. The rollers 92b provided on the outer guide plates 94 also contact the surfaces on the upstream side of the hairpin-shaped heat-exchanger tubes 20 disposed on the even-numbered arrangement plates 32.

The lowering of the orientation changing unit 90 stops when the rollers 92 are at a position at around ⅓ of the length in the up-down direction of the hairpin-shaped heat-exchanger tubes 20 from the upper end portions of the hairpin-shaped heat-exchanger tubes 20.

Next, as depicted in FIG. 12B, the linear movement apparatus 108 of the orientation changing unit 90 is driven by the control unit 70 so that the entire orientation changing unit 90 moves horizontally toward the insertion apparatus. When this happens, due to the horizontal movement of the orientation changing unit 90, the rollers 92a provided on the outer guide plates 94 press the upstream sides of the hairpin-shaped heat-exchanger tubes 20 disposed on the odd-numbered arrangement plates 32 to push up the hairpin-shaped heat-exchanger tubes 20 from below so as to rotate from the vertical direction to the horizontal direction.

At this time, the bent portions 21 of the hairpin-shaped heat-exchanger tubes 20 catch on the insides of the first stoppers 40, resulting in the lower end portions of the hairpin-shaped heat-exchanger tubes 20 being gradually lifted upward about the bent portions 21 toward the insertion apparatus.

In the same way, due to the horizontal movement of the orientation changing unit 90, the rollers 92b provided on the outer guide plate 94 press the upstream sides of the hairpin-shaped heat-exchanger tubes 20 disposed on the even-numbered arrangement plates 32 to push up the hairpin-shaped heat-exchanger tubes 20 from below so as to rotate from the vertical direction to the horizontal direction.

At this time, the bent portions 21 of the hairpin-shaped heat-exchanger tubes 20 catch on the insides of the second stoppers 42, resulting in the lower end portions of the hairpin-shaped heat-exchanger tubes 20 being gradually lifted upward about the bent portions 21 toward the insertion apparatus.

The inner guides 96 advance between the legs 22 of the hairpin-shaped heat-exchanger tubes 20 as the lower end portions of the hairpin-shaped heat-exchanger tubes 20 gradually rotate toward the insertion apparatus.

In FIG. 12C, after the orientation changing unit 90 has been moved a predetermined distance in the horizontal direction by the control unit 70, horizontal movement by the linear movement apparatus 108 is stopped, and the cylinder apparatus 102 is driven to raise the orientation changing unit 90 by a predetermined distance.

Next, as depicted in FIG. 12D, driving of the cylinder apparatus 102 by the control unit 70 is stopped when the hairpin-shaped heat-exchanger tubes 20 reach a position where the hairpin-shaped heat-exchanger tubes 20 are oriented in the horizontal direction.

At this time, since the upper surface guide 98 is in contact with the upper surfaces of the legs 22 of the hairpin-shaped heat-exchanger tubes 20 and the rollers 92a and 92b also contact the lower surfaces of the hairpin-shaped heat-exchanger tubes 20, these components act as reliable guides in the up-down direction for the hairpin-shaped heat-exchanger tubes 20 that are oriented in the horizontal direction.

Additionally, since the outer guide plates 94 contact the outer side surfaces of the hairpin-shaped heat-exchanger tubes 20 and the inner guides 96 contact the inner side surfaces, these components act as reliable guides in the width direction (the horizontal direction) for the hairpin-shaped heat-exchanger tubes 20 that are oriented in the horizontal direction.

By providing the orientation changing unit 90 of this type, it is possible to suppress widening of the legs 22 of the hairpin-shaped heat-exchanger tubes 20 and hold the hairpin-shaped heat-exchanger tubes 20 in the horizontal direction so as to match the pitch of the through-holes 11 of the fin stack 10.

Note that the plurality of hairpin-shaped heat-exchanger tubes 20 that have been aligned in the horizontal direction at the regular pitch by the orientation changing unit 90 are transferred onto the guide apparatus 110 depicted in FIG. 2.

The guide apparatus 110 holds the plurality of hairpin-shaped heat-exchanger tubes 20 that have been aligned in the horizontal direction at the regular pitch and moves the hairpin-shaped heat-exchanger tubes 20 toward the insertion side.

Although various preferred embodiments of the present invention have been described above, it should be obvious that the present invention is not limited to such embodiments and can be subjected to a variety of modifications within a range that does not depart from the spirit of the invention.

What is claimed is:

1. An alignment apparatus for aligning hairpin-shaped heat exchanger tubes to be inserted into through-holes in a fin stack for heat exchanging, the alignment apparatus comprising:

a regular pitch alignment unit that has arrangement plates, which each have an inclined portion whose upper surface is downwardly inclined toward an insertion position side, on whose inclined portions bent portions of the hairpin-shaped heat-exchanger tubes are suspended, and which are disposed so that the hairpin-shaped heat-exchanger tubes are oriented in an up-down direction, the arrangement plates being disposed at intervals that are double a pitch of the through-holes in the fin stack;

a stopper apparatus including a plurality of stoppers that stop the hairpin-shaped heat-exchanger tubes by contacting downstream sides of the bent portions of the hairpin-shaped heat-exchanger tubes at different positions on an upstream side and a downstream side in an inclined direction for each arrangement plate so that the hairpin-shaped heat-exchanger tubes disposed on the arrangement plates of the regular pitch alignment unit do not become adjacent at a same position;

a plurality of outer guide plates that each include a roller that contacts an upstream side of a leg of a hairpin-shaped heat-exchanger tube that has been stopped by the stopper apparatus and that each contact an outer side surface of a leg of the hairpin-shaped heat-exchanger tube;

a horizontal movement apparatus that moves the outer guide plates in a horizontal direction;

an up-down movement apparatus that moves the outer guide plates in an up-down direction; and a control unit that drives the horizontal movement apparatus to move the outer guide plates by a predetermined distance toward the insertion position and then drives the up-down movement apparatus to raise the outer guide plates by a predetermined distance to change an orientation of the hairpin-shaped heat-exchanger tubes to the horizontal direction.

2. An alignment apparatus for aligning hairpin-shaped heat exchanger tubes according to claim 1, further comprising an inner guide that is capable of moving horizontally and moving up and down together with the outer guide plates and is capable of advancing between the legs of the hairpin-shaped heat exchanger tubes at a position downstream of the outer guide plates.

3. An alignment apparatus for aligning hairpin-shaped heat exchanger tubes according to claim 1, further comprising an upper surface guide that is capable of moving horizontally and moving up and down together with the outer guide plates and contacts, at a position downstream of the outer guide plates, upper surfaces of the legs of the hairpin-shaped heat exchanger tubes whose orientation has changed to the horizontal direction.

* * * * *